Jan. 15, 1935.  G. F. YAGER  1,988,228
TOOL SLIDE ASSEMBLY
Filed June 15, 1931   4 Sheets-Sheet 1
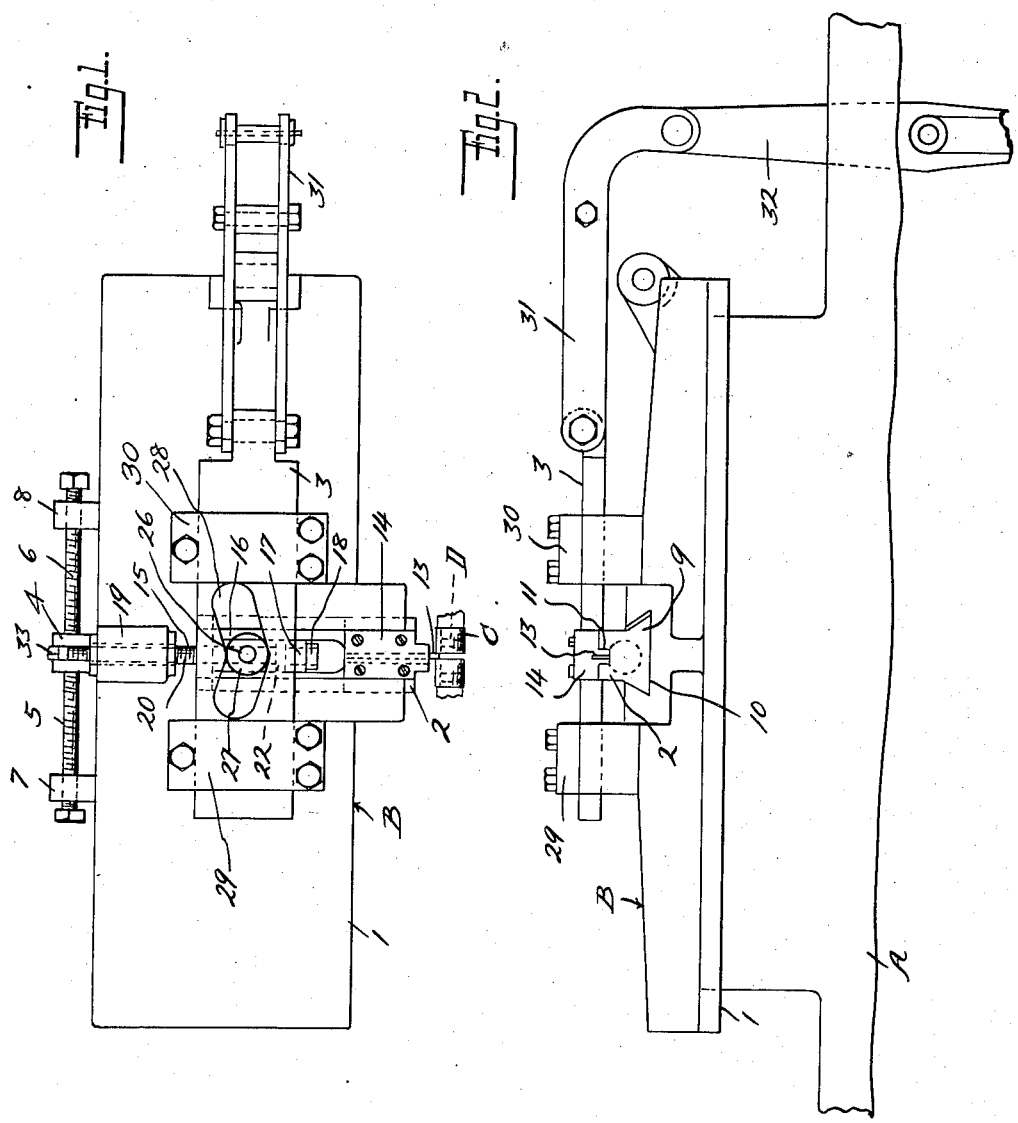
INVENTOR
George F. Yager
BY
ATTORNEYS

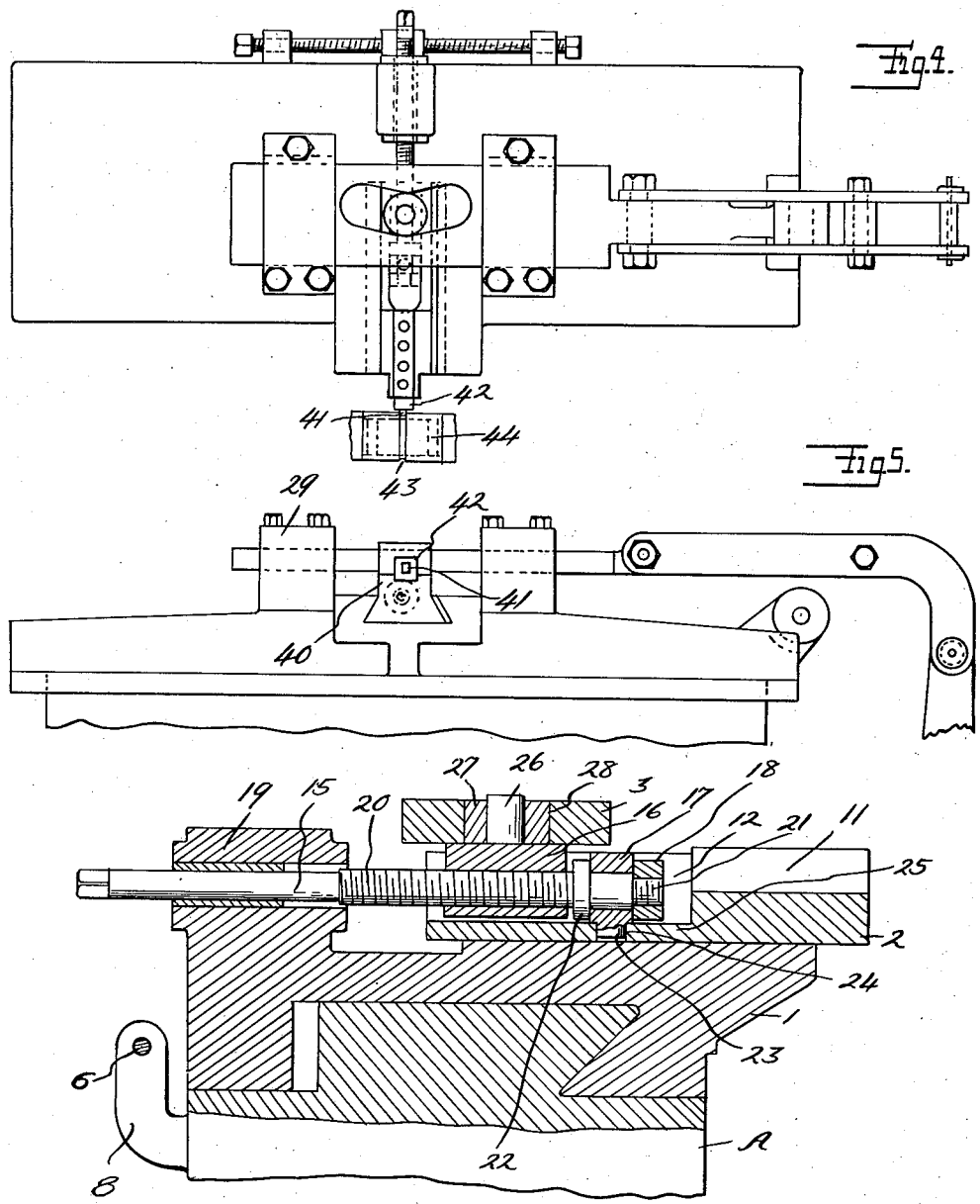

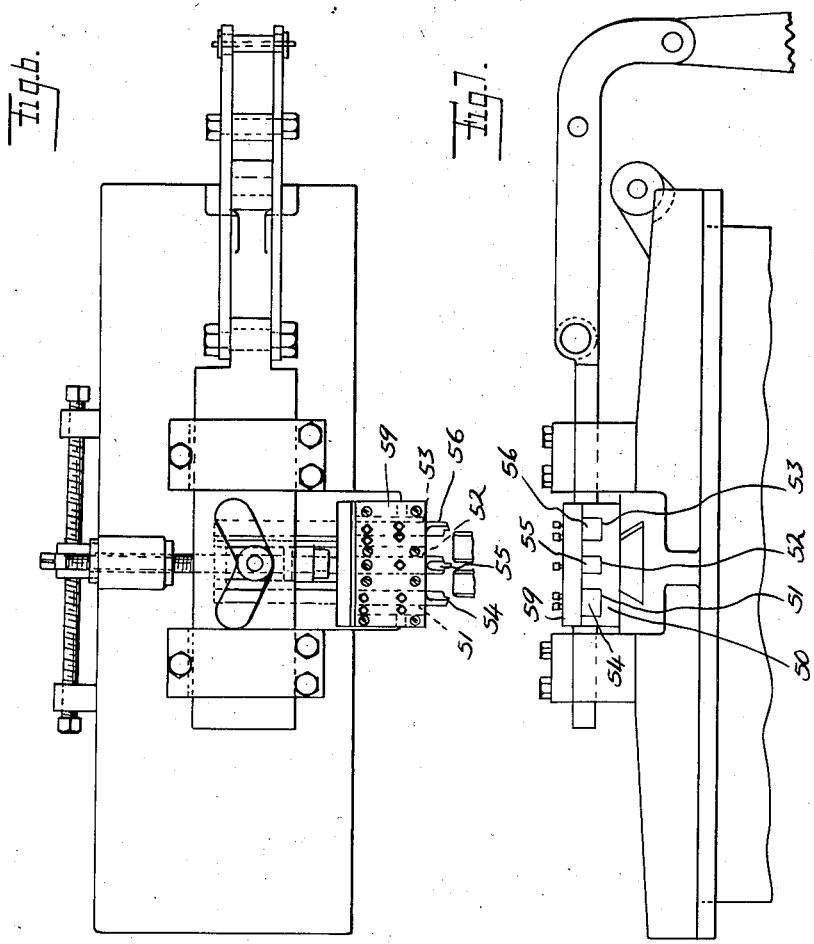

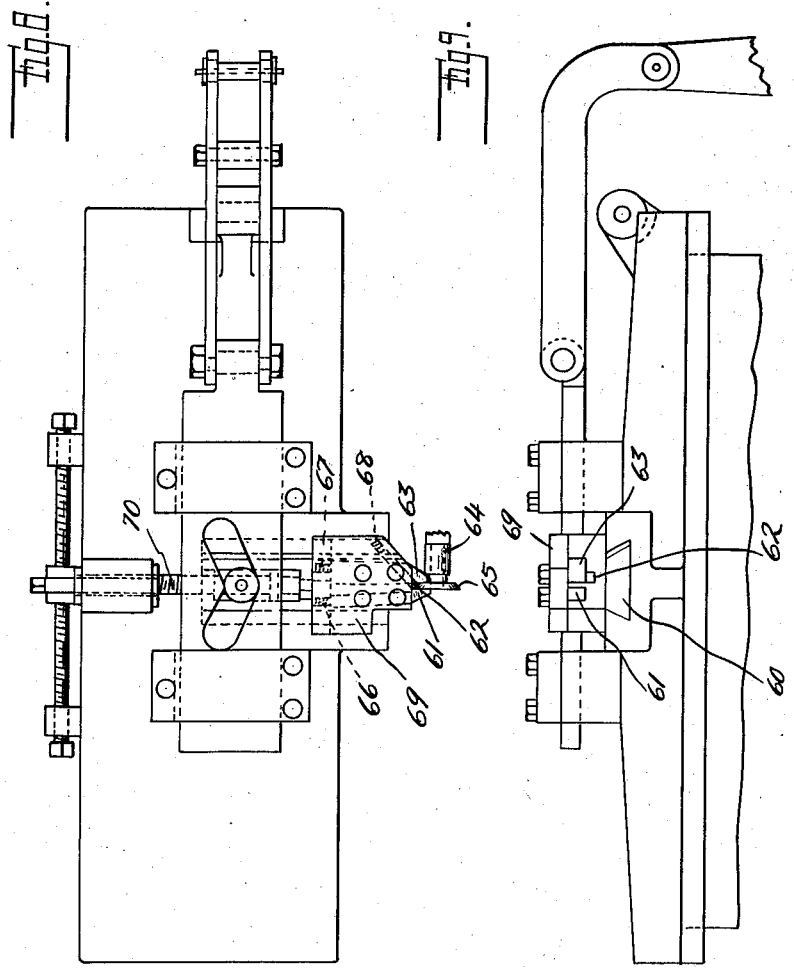

Patented Jan. 15, 1935

1,988,228

UNITED STATES PATENT OFFICE 1,988,228

TOOL SLIDE ASSEMBLY

George F. Yager, Toledo, Ohio, assignor to The Bunting Brass and Bronze Company, Toledo, Ohio, a corporation of Ohio Application June 15, 1931, Serial No. 544,595

9 Claims. (Cl. 82—24)

This invention relates generally to tool slide assemblies and refers more particularly to those capable of being actuated by mechanism such as that illustrated in my pending application Serial No. 434,797.

One of the essential objects of the invention is to provide an assembly of this type wherein a tool holder is reciprocable to and from the work by a cam reciprocable at substantially right angles thereto.

Another object is to provide a tool slide assembly wherein the cam aforesaid is constructed and arranged in such a way that it is capable of moving the tool holder in opposite directions while it is moving in one direction so that the tool will engage the work twice upon one complete reciprocation of the cam.

Another object is to provide a tool slide assembly wherein the driving connection between the cam and tool holder includes means for manually adjusting the tool holder relative to the cam and work to compensate for work of various sizes.

Other objects, advantages and novel details of construction of this invention will be made more apparent as this description proceeds, especially when considered in connection with the accompanying drawings, wherein:

Figure 1 is a fragmentary top plan view of a machine equipped with a tool slide assembly embodying my invention;

Figure 2 is a front elevation of the structure illustrated in Figure 1;

Figure 3 is a cross sectional view through the assembly;

Figure 4 is a view similar to Figure 1 but showing a slight modification;

Figure 5 is a front elevation of the structure illustrated in Figure 4;

Figure 6 is a top plan view of another modification;

Figure 7 is a front elevation of the structure illustrated in Figure 6;

Figure 8 is a top plan view of another modification;

Figure 9 is a front elevation of the structure illustrated in Figure 8.

Referring now to the drawings, A is the frame of a machine similar to that illustrated in my copending application, Serial No. 434,797, and B is a tool slide assembly embodying my invention and adjustably mounted on said frame. As shown, the assembly includes a base member or support 1, a tool holder 2 slidable transversely of the support, and a cam 3 crossing the holder 2 and slidable substantially longitudinally of the support. Preferably the support 1 is provided at one side with a projection 4 that is engaged by bolts 5 and 6 respectively threadedly engaging portions 7 and 8 of the frame A. Thus by turning these bolts the support 1 may be properly adjusted longitudinally on the frame A.

The tool holder 2 has an enlarged base portion 9 movable longitudinally of a suitable groove 10 in the support 1 and is provided with stepped upwardly opening longitudinally extending channels 11 and 12 respectively. Preferably the shank of a suitable tool such as a cutter 13 is held in the channel 11 by means of a retainer plate 14 bolted to the holder 2, while a shaft 15, a nut 16, a block 17, and a collar 18 are all received within the channel 12. As shown, the shaft 15 is journaled in an upstanding portion 19 of the support and in the block 17 and has threaded portions 20 and 21 respectively engaging the nut 16 and collar 18. A flange 22 is provided on the shaft 15 at one side of the block and the latter is provided with a depending cylindrical pin 23 that engages a circular opening 24 in the base 25 of the channel 12. The nut 16 also has a cylindrical pin 26 upon which a roller 27 is journaled. The cam 3 has a substantially V-shaped slot 28 receiving the roller 27 and is slidable in brackets 29 and 30 respectively bolted to the support 1. A link 31 is connected to one end of the cam 3 and is adapted to be reciprocated by a pivotally mounted lever such as 32 corresponding to levers 62 in my application, Serial No. 434,797. Thus with this construction the cam 3 upon movement in either direction will cause the roller 27, nut 16, shaft 15, block 17, holder 2 and tool 13 to move in unison to and from the work to effect a cutting operation. As a result two cutting operations are obtained upon one complete reciprocation of the cam. In the present instance the work is a tubular casting C that is held in rotating arbors D corresponding to 82 in application Serial No. 434,797 and is cut midway of its ends by the tool 13 to provide two bushings. When castings of larger or smaller diameter are to be cut a shaft 15 is rotated by applying a wrench to the hexagonal end 33 thereof so that the holder 2 may be moved inwardly or outwardly as desired relative to the cam 3. Thus the adjustment of the tool holder is made through the actuating means for the holder.

In Figures 4 and 5 I have illustrated a slight modification wherein the tool holder 40 has a relatively wide and shallow channel 41 that receives the shank of a tool 42 for forming a circular oil groove 43 in the tubular casting 44 midway of its ends. Otherwise the structure is the same as in Figures 1 to 3 inclusive.

In Figures 6 and 7 I have illustrated another modification in which the tool holder 50 is quite wide and has three laterally spaced upwardly opening longitudinally extending channels 51, 52 and 53 respectively that receive tools 54, 55 and 56 respectively for facing, chamfering and cutting the tubular casting to provide two bushings 57 and 58 respectively as shown. A single plate 59 bolted to the holder 50 retains the tools 54, 55 and 56 respectively in place. Otherwise the structure is the same as that illustrated in Figures 1 to 3 inclusive.

In Figures 8 and 9 the tool holder 60 carries three tools 61, 62 and 63 respectively for facing and chamfering flanged castings 64 of tubular formation. As shown, the facing tools 61 and 63 respectively extend longitudinally of the holder 60 and engage opposite sides of the flange 65 of the casting, while the chamfering tool 62 extends at substantially an acute angle to the longitudinal median line of the holder and engages an edge of the flange 65. The tools 61, 62 and 63 respectively are individually adjustable by set screws 66, 67 and 68 respectively threadedly engaging the holder 60 in alignment with the tools and are held in adjusted position by a single plate 69 bolted to the holder. However, the three tools, 61, 62, 63, holder 60 and plate 69 may be adjusted in unison by rotating the shaft 70 as heretofore described.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a tool slide assembly, a base adjustable relative to the work, means for holding the base in any adjusted position, a tool holder carried by and movable laterally relative to the base, and a cam movable in a direction substantially at right angles to the direction of movement of the holder, and actuating means for the holder including an element engaging the cam, and a connection between said element and holder including adjustable means capable of varying the throw of the holder.

2. A tool slide assembly including a base, a longitudinally movable tool holder on the base, and means for moving the holder including a shaft journaled in a portion of the base and extending longitudinally of the holder, a block sleeved on the shaft and having a part engaging the holder, abutments for the block carried by the shaft, a nut threadedly engaging the shaft at one side of one of the abutments and having a projection, a roller carried by the projection, and a reciprocating member crossing the holder and having a cam slot receiving said roller.

3. A tool slide assembly including a base, a tool holder slidable on the base and having a groove therein, and means for moving the tool holder relative to the base including a shaft journaled in a portion of the base and extending longitudinally of the groove in spaced relation to the walls thereof, a block sleeved upon the shaft and having a projection engaging the holder, abutments for the block carried by the shaft, a nut on the shaft adjacent one of the abutments and having a projection, a roller sleeved upon the last mentioned projection, and an automatically operable reciprocating member having a cam slot receiving the roller.

4. A tool slide assembly including a base having an upstanding portion, a tool holder slidable on the base opposite the upstanding portion and having a groove in substantially horizontal alignment with said upstanding portion, a shaft journaled in said upstanding portion and extending longitudinally of the groove, a block sleeved on the shaft and having a projection engaging the base of the groove in the tool holder, abutments for the block carried by the shaft, a nut threadedly engaging the shaft beside one of the abutments and having a projection, a roller carried by the last mentioned projection, and a reciprocating member extending at substantially right angles to the tool holder and having a substantially V-shaped cam slot receiving said roller.

5. A tool slide assembly including a base, a tool holder slidable on the base and having an upwardly opening groove therein, a shaft extending longitudinally of the groove, a block supporting the shaft and having a projection engaging the base of the groove, abutments for the block carried by the shaft, a nut on the shaft adjacent one of the abutments and having an upstanding projection, a roller carried by the last mentioned projection, and a reciprocating member having a cam slot receiving said roller.

6. A tool slide assembly including a base, a tool holder slidable on the base, means for adjusting the tool holder relative to the base including a shaft journaled in a portion of the base, a block sleeved upon the shaft and fixed to the tool holder, and abutments for the block carried by the shaft, and means for automatically reciprocating said tool holder on the base including a nut mounted on the shaft and having a projection, a roller sleeved upon said projection, and a reciprocating member having a cam slot receiving said roller.

7. A tool slide assembly including a base, a tool holder slidable on the base and having an upwardly opening groove therein, and means for adjusting the holder relative to the base including a rotatable shaft journaled in a portion of the base and extending longitudinally of the groove, spaced abutments on the shaft, a block sleeved on the shaft between the abutments and having a projection secured to the base of the groove, a nut threadedly engaging the shaft at one side of one of the abutments and having a projection, a roller carried by the last mentioned projection, and a reciprocating member crossing the holder and having a cam portion engaging said roller.

8. A tool slide assembly including a base, a tool holder slidable relative to the base and having an upwardly opening groove therein, a block within the groove and having a projection fixed to the base of the groove, and means for adjusting the tool holder relative to the base including a rotatable shaft having portions journaled in a portion of the base and in said block, abutments for the block carried by the shaft, one on each side of the block, a nut threadedly engaging the shaft at one side of one of the abutments and having a projection, a roller carried by said projection, and a reciprocating member adjacent the holder and having a cam portion engaging said roller.

9. A tool slide assembly including an adjustable base, a support for the base, members projecting laterally from the base at spaced points thereof, a member projecting laterally from the support at a point intermediate the members just mentioned, and means for adjusting the base relative to the support including rotatable elements threadedly engaging the first mentioned members and abutting opposite sides of the last mentioned member.

GEORGE F. YAGER.